United States Patent [19]
Seiberlich

[11] 3,976,791
[45] Aug. 24, 1976

[54] SOFT PRETZEL
[76] Inventor: Richard R. Seiberlich, 1120 E. Algonquin Road, Apt. 3J, Schaumburg, Ill. 60172
[22] Filed: Nov. 24, 1975
[21] Appl. No.: 634,374

Related U.S. Application Data
[63] Continuation-in-part of Ser. No. 566,274, April 9, 1975, abandoned.

[52] U.S. Cl. ................................. 426/19; 426/27; 426/143
[51] Int. Cl.² ......................................... A21D 2/00
[58] Field of Search ............... 426/27, 19, 93, 143, 426/94, 295, 296

[56] References Cited
UNITED STATES PATENTS
3,306,751  2/1967  Appleby........................... 426/295

OTHER PUBLICATIONS
Bohn, R. M. "Biscuit & Cracker Production" 1957 Quinn & Borden Co., Inc. Rahway, N.J. pp. 88–90.
Matz, S. A. "Cookie & Cracker Technology" 1968 The Ari Publishing Co., Inc. Westport Conn. pp. 146–149.

Primary Examiner—Raymond N. Jones
Attorney, Agent, or Firm—Donnie Rudd

[57] ABSTRACT

A process is disclosed for producing a pretzel which upon cooking will remain soft for an extended period of time, i.e., for a time period greater than 12 hours, with the process consisting essentially of mixing about 51 parts by weight water, sufficient yeast to cause a flour mixture to rise; mixing the water and yeast with about 100 parts by weight wheat flour with the wheat flour being present in an amount sufficient to prevent substantial cooling and moisture loss in the mixture; blending the ingredients for at least 8 minutes; forming the mixture into the shape of a pretzel or other shape; saturating the outside of the formed, uncooked pretzel with a sodium hydroxide solution; and cooling the sodium hydroxide coated, uncooked pretzel until the temperature thereof is below −15°F. for at least 1 hour.

11 Claims, No Drawings

SOFT PRETZEL

CROSS REFERENCE TO RELATED APPLICATION

This application is a continuation-in-part of U.S. patent application Ser. No. 566,274 filed April 9, 1975 and abandoned after the filing of this application.

BACKGROUND OF THE INVENTION

1. Field of the Invention:

This invention relates to a process for producing a soft pretzel which remains soft for an extended period of time.

2. Description of the Prior Art:

Soft pretzels have been well known for many years. They have been articles prepared in the home and articles sold on the street corners for decades. They have a pleasant, soft taste of bread-like quality and texture and are enjoyed by the massess. Heretofore, soft pretzels have been produced by limited production with a high turnover rate in order to provide the desired taste. Unlike the hard pretzels which are consumed as snacks or appetizers, the soft pretzel must remain soft until consumption in order to achieve the requisite texture and thereby satisfy the purchasers. If the soft pretzel becomes hard, it is then totally unacceptable. This requirement for softness has led to the quick turnover rate and purchase at point of production so that consumption could be accomplished prior to the pretzel becoming hard. If sales were to be performed on the streetcorner, then limited quantities of the pretzel were produced and sold rapidly before they became stale, i.e. hard. This requires baking several times a day since normally these pretzels would become hard in a very short time and would never have a shelf life of more than about 3 or 4 hours.

In recent years, highly commercialized production of hot pretzels has occurred, usually in retail outlets in major shopping centers or the like. The more popular of these, and the more successful such operations, all have a cooking apparatus located within a small store to essentially cook the product immediately prior to consumption by the consumer. Retention of the cooked pretzel must be for a very short time in order that it may be consumed before it becomes hard. This necessitates a high turnover rate and almost constant production, at a low rate of production, in order to essentially keep up with the instant demand of the product. Needless to say, this is labor intensive. Heretofore, if this production occurred too fast, then the product would soon become hard and lose its acceptability. Consequently, the production of soft pretzels has been rather limited in scope and for decades has been desperately seeking an embodiment of a pretzel which would stay soft for an extended period of time, i.e. for greater than 12 hours.

The new and novel process for producing this soft pretzel makes use of common pretzel ingredients but uses them in such a manner as to produce a pretzel having an extended softness time.

SUMMARY OF THE INVENTION

It is an object of this invention to provide a process for producing a pretzel which will remain soft after cooking for at least about 12 hours time.

It is a further object of this invention to provide a process for producing a cooked pretzel wherein said cooked pretzel will stay soft for greater than about 12 hours.

The objects of this invention are accomplished by a process for producing a pretzel which, after cooking, will remain soft for an extended period of time, said process consisting essentially of:

a. mixing from about 51 parts by weight water having a temperature of from about 60°F. to 90°F. with sufficient yeast to cause a mixture containing 100 parts by weight flour to rise, said mixing completely blending the yeast and water, and said mixing occurring for at least 1 minute;

b. mixing the yeast water mixture with about 100 parts by weight wheat flour, with said wheat flour being mixed in an amount sufficient to prevent substantial cooling and moisture loss in the mixture, and preferably in an amount greater than about 100 pounds by weight, said mixing occurring at least about 8 minutes;

c. forming the mixture into the shape of a pretzel or other food shape;

d. saturating the outside of the formed pretzel with a sodium hydroxide solution; and e. cooling the sodium hydroxide coated pretzel until the temperature thereof is below −15°F. for at least 1 hour.

Preferably the process of this invention is one in which the process of mixing also includes about 1 tablespoon per 100 pounds of mixture of a softener comprising a mixture of vegetable monoglycerides and diglyderides.

In providing a cooked pretzel, it is preferable to cook the pretzel at a temperature of from 450°F. to 800°F. for from 3 to 9 minutes.

This pretzel process first includes the mixing of from about 51 parts by weight water having a temperature of from about 60°F. to about 90°F. with sufficient yeast to cause a flour mixture to rise with said mixture completely blending the yeast and water and said mixing occurring for at least 1 minute. Next, the yeast-water mixture is mixed with about 100 parts by weight wheat flour with the total wheat flour in the total mixture being an amount sufficient to prevent substantial cooling and moisture loss in the mixture and preferably in an amount of at least about 100 pounds and with the mixing of the yeast, water, and flour completely blending the ingredients and said mixing occurring for at least about 8 minutes. While water and wheat flour are commonly mixed with yeast to provide a pretzel, it is generally done with higher levels of water, and I have found that if the water is reduced to about 51 parts by weight per 100 pounds by weight wheat flour and the consequent steps occur, then the pretzel will remain soft. It must be emphasized that the amount of water is critical in providing a soft pretzel, and substantially larger amounts of water will not at all make possible the soft pretzel produced herein. In other words, the amount of water used in this process is completely critical to the process and must not be substantially exceeded.

The mixing of the water and wheat flour also includes the mixing of sufficient yeast to cause the mixture to rise. One skilled in the pretzel and bread industry can readily determine the amount of yeast for such a process, however, I have found that if fresh caked yeast, such as that under the trademakr Fleishmann's Yeast for use in baking, in an amount of 3 pounds of yeast per 100 pounds of wheat flour is quite sufficient to provide the product that I desire. While any of the common baking rising yeasts are claimed herein, saccharomyces cerevisiae is particularly acceptable.

The yeast-water mixture may also contain as a softener a mixture of vegetable monoglycerides and diglycerides and any such mixture or balance normally used in the baking industry is acceptable for use herein. I prefer to add an amount of about 1 tablespoon per 100 pounds of mixture.

The mixing process of this invention must be such as to completely blend all of the ingredients. The first mixing of yeast and water should occur for at least 1 minute in order to insure that the mixture is completely blended together and sufficient to make a high quality pretzel, and the second mixing with the flour should occur for at least about 8 minutes time.

The total mixture should have a total wheat flour content sufficient to prevent substantial cooling and moisture loss in the mixture. Preferably this is at least about 100 pounds. I have found that if a much smaller batch of dough is prepared, then it does not have the same high quality as the one mixed having a total wheat flour content as specified. While it is unclear why this requirement exists, it is believed that the mass must be sufficient that heat loss will not be so great as to cause the yeast to become inactive or to substantially reduce the reproduction of the yeast. Also, small batches tend to loose moisture and become undesirable. The size of the batch therefore controls these variables although it is to be understood that batches smaller than 100 pounds can be used if temperature and humidity are properly controlled. Since larger batches are advantageous for production, I prefer to maintain the batch size over 100 pounds in order to additionally take advantage of the other features and produce a high quality product.

After the mixture has been thoroughly blended for the requisite procedural conditions, the mixture is then formed into the shape of a pretzel or the like including other food shapes such as alphabetical letters. The shaping or forming can be in any known manner and would include conventional rolling and forming techniques but it is especially desirable to include that forming operation in which a continuous extrusion of the pretzel mixture is accomplished with a cross-sectional design of a pretzel or the like and then a knife or slicing blade or other such thing slices the extruded mixture, as it is extruded, to form a pretzel or the like. While the forming is intended to be in the shape of a pretzel, since a soft pretzel is the object of this invention, it is obvious that other designs, other than a classical pretzel design, may be created by the forming and it is intended to cover those other designs in which a pretzel-like taste and soft pretzel texture are desired even though the shape may not be of the conventional or classical pretzel shape.

After the mixture is formed, the outside thereof is then saturated by coating with a sodium hydroxide solution. The saturation of the outside of the pretzel with a sodium hydroxide solution is that same procedure commonly used in the production of pretzels and is intended to mean all such concentrations and solutions of sodium hydroxide as have been used in the production of pretzels. It is particularly desirable, however, to coat the outside of the pretzels with a spray of sodium hydroxide solution with said sodium hydroxide solution being prepared by mixing 8 ounces of 50 percent sodium hydroxide in a gallon of cold water.

After the pretzel is coated with sodium hydroxide solution it must then be cooled until the temperature thereof is below about −15°F. for at least 1 hour. The temperature of cooling is critical and, for instance, if −10°F. or if merely the freezing point is achieved, then the product will not be acceptable. The cooling of the uncooked pretzel must be below −15°F. and this temperature reduction must be continued for at least 1 hour. If the temperature rises substantially above this level, then the product will not be acceptable and additionally, the cooling must be maintained such that the temperature remains below about −15°F. until essentially just prior to cooking. While −15°F. achieves an acceptable product, the preferred embodiment of this invention is one in which the temperature is reduced to below about −30°F.

While any conventional wheat flour commonly used in the baking industry is highly acceptable for use herein including patent flour, I have found that it is particularly desirable to use well known bromated, bleached, unenriched wheat flour in producing the product of this invention.

When the pretzel of this process is produced by cooking, the process further includes maintaining the pretzel at a temperature below −15°F. until just prior to cooking and then cooking the pretzel at a temperature of from 450°F. to 800°F. for from 3 to 9 minutes. The resulting product is a highly acceptable soft pretzel which retains its softness for at least about 12 hours.

As in most pretzels, the product is covered with salt to provide the desired taste. The process of this invention also may include the topical application of sodium chloride crystals after the sodium hydroxide solution has been coated onto the pretzel and prior to cooking of the pretzel. In such case, the sodium chloride must be in the crystalline form, in other words, it should be the large, crystalline sodium chloride commonly used in the pretzel industry.

DESCRIPTION OF THE PREFERRED EMBODIMENTS

This invention may be more fully described but is not limited by the following example. For purposes of example, three samples of pretzels were chosen from various commercial establishments. Soft pretzels purchased at Sears and Kresges each hardened by the end of 6 hours' time. Samples of soft pretzels purchased under the tradename HOTSAM, trademark General Host Corporation, were found to harden in little more than 1 hour's time period.

EXAMPLE

24½ Quarts of lukewarm water were admixed for 3 minutes with 3 pounds of cake yeast (saccharomyces cerevisiae) and 1 tablespoon of a mixture of vegetable mono- and diglycerides. This mixture was then mixed with 100 pounds of bromated, bleached, unenriched flour for 13 minutes. The mixture was then extruded in a pretzel shape and sliced to form pretzels. The pretzels were sprayed with a solution of sodium hydroxide and water, formed by mixing 8 ounces of 50 percent sodium hydroxide in a gallon of cold water. After the surface was coated, sodium chloride crystals were topically applied and the pretzels were frozen to −30°F. After freezing for 2 days, the pretzels were baked at 700°F. for about 3½ minutes and produced a pretzel which remained soft greater than 12 hours.

The above example constitutes the preferred embodiment of this invention.

It may thus be seen that I have invented a new and novel process for producing a new and novel pretzel. The new and novel soft pretzel produced by this new and novel process will stay soft longer than any other pretzel heretofore known. The pretzel is capable of ready commercial success because it can be cooked in the morning at one production and kept warm and soft for the remaining part of the commercial day without need for constant attention or cooking.

Having fully described this new and unique invention I claim:

1. A process for producing a pretzel which, after cooking, will remain soft for an extended period of time, said process consisting essentially of:
   a. mixing from about 51 parts by weight water having a temperature of from about 60°F. to 90°F. with sufficient yeast to cause a mixture containing 100 parts by weight flour to rise, said mixing completely blending the yeast and water, and said mixing occurring for at least 1 minute;
   b. mixing the yeast-water mixture with about 100 parts by weight wheat flour, with said wheat flour being mixed in an amount greater than about 100-lbs. by weight, said mixing occurring at least about 8 minutes;
   c. forming the mixture into the shape of a pretzel or other food shape;
   d. saturing the outside of the formed pretzel with a sodium hydroxide solution; and
   e. cooling the sodium hydroxide coated pretzel until the temperature thereof is below −15°F. for at least 1 hour.

2. A process as in claim 1 further including in the yeast-water mixture about 1 tablespoon per 100-lbs. of mixture of a softener comprising a mixture of vegetable monoglycerides and diglycerides.

3. A process as in claim 1 wherein the yeast is a fresh cake yeast including saccharoymces cerevisiae.

4. A process as in claim 1 wherein the flour is bromated, bleached, unenriched flour.

5. A process as in claim 1 further including maintaining the pretzel at a temperature below −15°F. until cooking, and then cooking the pretzel at a temperature of from 450°F. to 800°F. for from 3 to 9 minutes.

6. A process as in claim 1 wherein the cooling temperature is about −30°F.

7. A process as in claim 5 wherein the cooling temperature is about −30°F.

8. A process as in claim 1 wherein the forming is accomplished by slicing a continuously extruded formed shape having a pretzel-shaped cross-section.

9. A process as in claim 1 wherein after the coating of the pretzel with sodium hydroxide solution, sodium chloride crystals are topically applied thereto.

10. A process as in claim 5 wherein between the sodium hydroxide coating step and the cooking step sodium chloride crystals are topically applied to the coated pretzel.

11. A process for producing a pretzel which, after cooking, will remain soft for an extended period of time, said process consisting essentially of:
    a. mixing from about 51 parts by weight water having a temperature of from about 60°F. to 90°F. with sufficient yeast to cause a mixture containing 100 parts by weight flour to rise, said mixing completely blending the yeast and water, and said mixing occurring for at least 1 minute;
    b. mixing the yeast-water mixture with about 100 parts by weight wheat flour, with said wheat flour being mixed in an amount sufficient to prevent substantial cooling and moisture loss in the mixture, said mixing occurring at least about 8 minutes;
    c. forming the mixture into the shape of a pretzel or other food shape;
    d. saturating the outside of the formed pretzel with a sodium hydroxide solution; and
    e. cooling the sodium hydroxide coated pretzel until the temperature thereof is below −15°F. for at least 1 hour.

* * * * *